(No Model.)  J. R. INGRAM.  2 Sheets—Sheet 1.
PLOW.

No. 598,934. Patented Feb. 15, 1898.

Witnesses
H. J. Koerth.
V. B. Hillyard

Inventor
John R. Ingram,
By his Attorneys,
C. A. Snow & Co.

(No Model.) 2 Sheets—Sheet 2.
J. R. INGRAM.
PLOW.
No. 598,934. Patented Feb. 15, 1898.
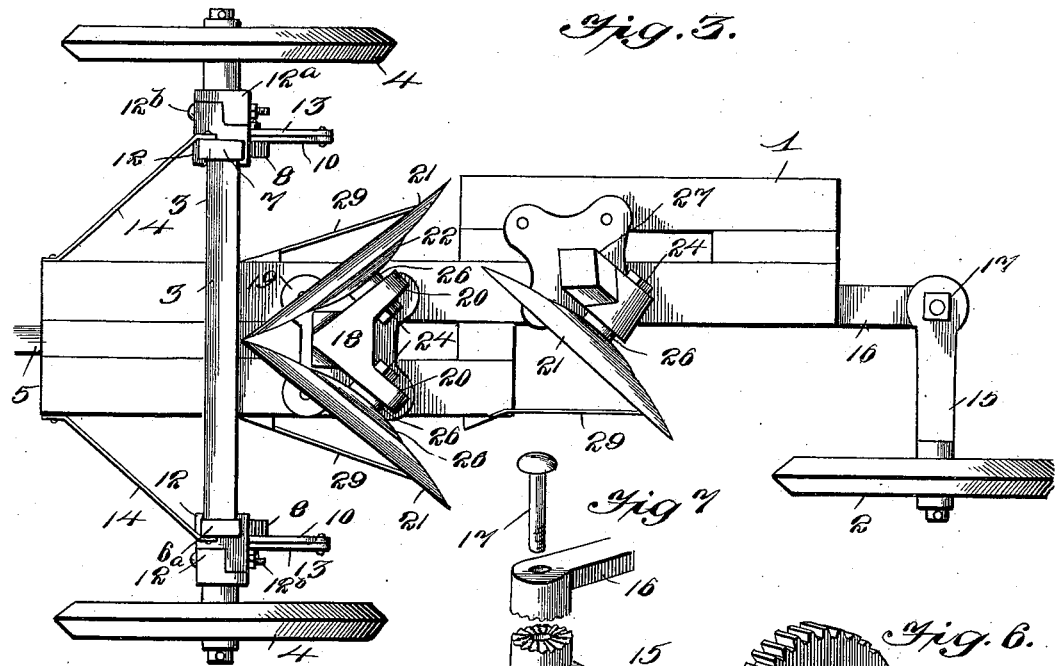
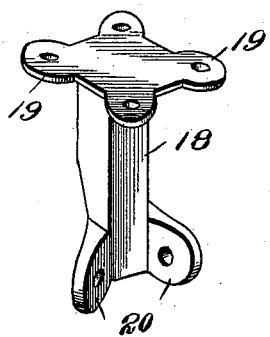
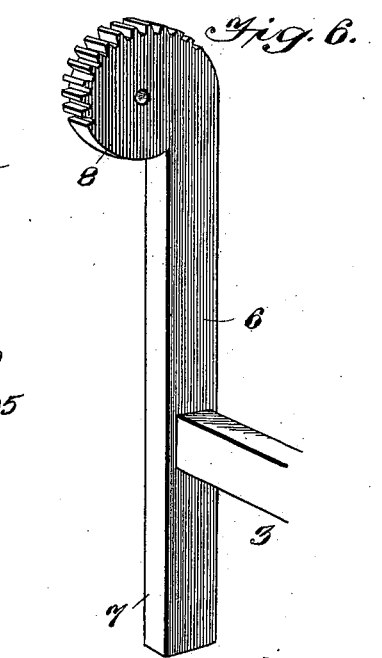
Witnesses
H. J. Koerth.
V. B. Hillyard.
Inventor
John R. Ingram
By his Attorneys,
C. A. Snow & Co.

UNITED STATES PATENT OFFICE.

JOHN R. INGRAM, OF WAXAHACHIE, TEXAS.

PLOW.

SPECIFICATION forming part of Letters Patent No. 598,934, dated February 15, 1898.

Application filed May 26, 1896. Serial No. 593,164. (No model.)

*To all whom it may concern:*

Be it known that I, JOHN R. INGRAM, a citizen of the United States, residing at Waxahachie, in the county of Ellis and State of Texas, have invented a new and useful Plow, of which the following is a specification.

This invention aims to provide a plow which by slight alterations, shifting, and leaving off of some of the parts can be made to break ground, bed the land, list, or perform any required work, according to the nature of the soil and the seed to be sown or the plants to be cultivated.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
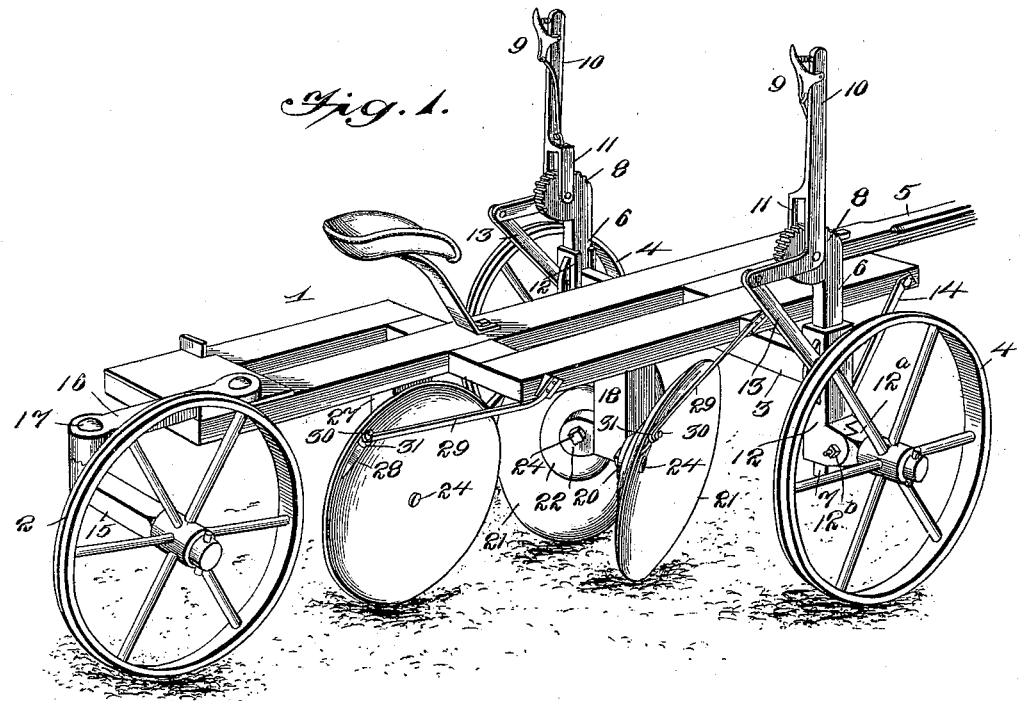
Figure 2:
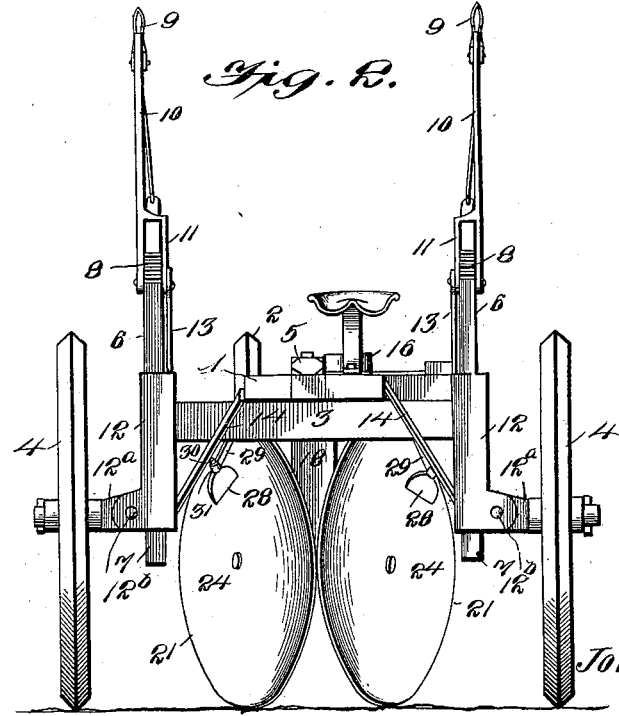

Figure 1 is a perspective view of a plow constructed in accordance with the principles of this invention. Fig. 2 is a front view thereof. Fig. 3 is a view of the implement inverted. Fig. 4 is a detail view of a plow-standard having oppositely-inclining wings. Fig. 5 is a detail section showing a plow-disk bearing. Fig. 6 is a detail view of an end portion of the arched axle. Fig. 7 is a detail view of the adjacent ends of the arms supporting the rear wheel, showing the means for positively securing them together in an adjusted position.

Corresponding and like parts are referred to in the following description and indicated in the several views of the accompanying drawings by the same reference characters.

The frame 1, to which the plowing-disks are attached, is supported at its rear end by means of a caster-wheel 2 and at its front end upon an arched axle 3, having ground-wheels 4 at its ends. The draft is applied to the implement by being hitched to a pole or tongue 5, secured to the front end of the frame in any convenient way.

Standards 6 are provided at the ends of the axle 3 and are in line with the pendent terminal portions thereof and form in effect prolongations of the pendent parts 7. The upper ends of the standards 6 are expanded and curved, forming heads 8, which are toothed, to be engaged by a hand-latch 9, carried by an operating-lever 10, having pivotal connection with each of the heads 8. A keeper 11 is secured to a side of each operating-lever 10 and engages with the edge portion of the head, so as to prevent outward displacement of the lever. Brackets 12 are slidably mounted upon the pendent parts 7 and standards 6 of the arched axle and have spindles upon which are mounted the ground-wheels 4. These brackets 12 are guided in their vertical movements by the parts 6 and 7. A link 13 connects the brackets 12 with the short arm of the respective operating-levers 10, so that upon turning the levers upon their fulcra the brackets and the ground-wheels carried thereby will be adjusted vertically, the latches engaging with the toothed portion of the heads and holding the parts in an adjusted position. Stays 14 connect the outer ends of the arched axle with the frame and brace and strengthen the parts.

The caster-wheel 2 is journaled upon a horizontal arm 15, which is adapted to swing horizontally to adapt the wheel 2 to the line of draft. A second arm 16 is secured to the rear end of the frame 1 in such a manner as to be moved horizontally, to the end that the wheel 2 may be moved laterally to any required position, and the meeting ends of the arms 15 and 16 are connected by means of a bolt 17 and have their opposing faces roughened or corrugated, so that upon tightening the bolt 17 the arms will be held positively in the adjusted position. When it is required to adjust the wheel 2 laterally for any purpose, the fastening employed for securing the arm 16 to the frame is loosened and the arm 16 is swung laterally to the desired position and is fixed by retightening the fastening previously loosened. This adjustment will throw the wheel 2 at an angle to the line of draft, and to bring it into proper position it is necessary to loosen the bolt 17, and after the wheel 2 is properly adjusted the position thereof is fixed by again tightening the bolt 17.

The plow-standard 18 is secured to the frame 1 in any convenient way and is expanded at its upper end, forming wings 19, which are apertured to receive the bolts or other means employed for connecting the standard to the frame. The lower end of the standard is formed with oppositely-inclining wings 20, which are transversely apertured to form bearings for receiving the spindles or journals provided for connecting the plow-disks 21 with the said standard. These wings 20 stand at an angle of about forty-five degrees and incline equally from the line of draft, so that the plow-disks will throw the earth equally in opposite directions. The plow-disks are of similar construction and are reinforced at a central point by a circular plate 22. A tubular bearing 23 extends from the circular plate and is journaled in the opening of the wings at the lower end of the plow-standard. A bolt 24 extends through the tubular bearing 23 and its projecting end is threaded and receives a nut 25, by means of which the tubular bearing is retained in place. An annular enlargement or washer 26 is provided at the base of the tubular bearing, and the bore of the wing is correspondingly enlarged to receive it, so as to prevent lost motion and provide for compensating for any looseness after the implement has seen service. The front plow-disks meet in front of the plow-standard 18 and unitedly act as a double-winged plow. A plow-standard 27, similar in construction to the plow-standard 18, is located in the rear of the latter and is preferably provided with only one wing, although, if desired, it may have two wings or be the duplicate of the standard 18. The plow-disk is applied to the standard 27 in precisely the same manner as the other plow-disks and is a counterpart thereof. By removing the rear plow-disk and one or the other of the front plow-disks the implement can be used as a single plow or cultivator for turning a single furrow, and when both front disks are in position the plow can be used for listing, and by changing the relation of the plow-disks the implement can be used for any required purpose.

The plow-disks are kept clean by means of scraper-blades 28, the latter having connection with the lower ends of rods or arms 29, which are secured at their upper ends to the frame, said rods or arms being elastic and capable of spring action, so as to hold the scraper-blades yieldingly against the front or active face of the plow-disks. Each blade 28 has a shank 30, which is fitted in a sleeve or band 31 at the lower end of its supporting rod or arm, whereby provision is had for the scraper to adapt itself so as to bear uniformly throughout its length against the face of the plow-disk.

For breaking ground it is advisable to have the wheels 4 relatively adjustable. This is best accomplished by jointing the horizontal arms of the brackets, so that the spindle portion $12^a$ can be turned upon the bolt $12^b$ to any required angle to cause the wheel 4 to run vertically or at any required declination. The opposing portions of the parts 12 and $12^a$ may be roughened in the usual way to prevent slipping even though the bolt $12^b$ should loosen.

Having thus described the invention, what is claimed as new is—

In an agricultural implement, a standard having its upper end expanded, forming wings which are apertured to receive fastenings, and formed at its lower end with oppositely-inclining wings which are transversely apertured, and plow-disks oppositely inclining and touching at their front ends and mounted upon spindles applied to the said wings, substantially as and for the purpose set forth.

In testimony that I claim the foregoing as my own I have hereto affixed my signature in the presence of two witnesses.

JOHN R. INGRAM.

Witnesses:
   TOM. R. WHIPPLE,
   H. T. BAILEY.